United States Patent Office 3,413,777
Patented Dec. 3, 1968

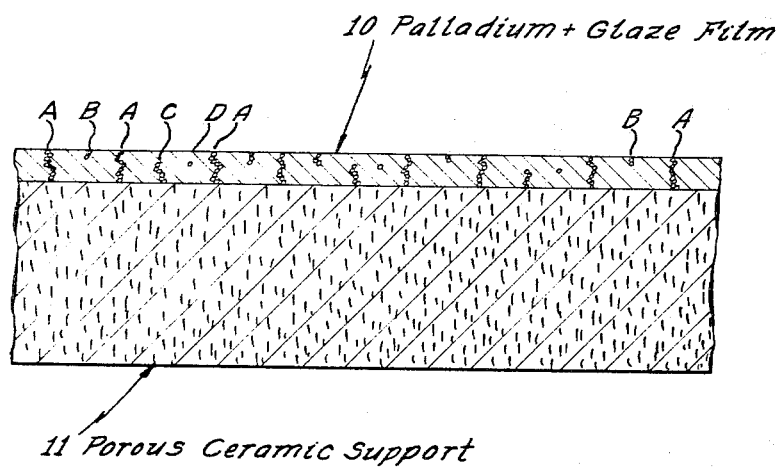

3,413,777
HYDROGEN DIFFUSION AND METHOD FOR
PRODUCING SAME
Robert C. Langley, Millington, and Herbert Myers, Newark, N.J., assignors to Engelhard Minerals & Chemicals Corporation, a corporation of Delaware
Filed June 22, 1965, Ser. No. 465,999
10 Claims. (Cl. 55—158)

ABSTRACT OF THE DISCLOSURE

Diffusion elements suitable for the diffusion separation of hydrogen from gaseous mixtures and methods for their preparation which elements consist of a porous ceramic body structure having a surface coating of a ceramic glaze containing finely-divided hydrogen-permeable metal embedded in a glass matrix.

This invention relates to apparatus for the separation of hydrogen from a mixture of gases by diffusion through a non-porous hydrogen-permeable membrane and, in particular, concerns novel means for producing a coated ceramic body for use in such apparatus.

It is known that hydrogen will permeate and diffuse through non-porous films of certain metals, notably palladium and palladium-containing alloys. Heretofore, diffusion apparatus for the separation of hydrogen from a mixture of gases has employed thin films of palladium or alloys thereof in the form of thin-walled tubes, or thin foils. Since the rate of diffusion of hydrogen is a function of the surface area of the non-porous septum employed, its thickness, the pressure differential across it and the temperature, means have been sought to provide a septum of minimum thickness adequately supported upon a pressure-resistant and temperature-stable structural support in order to maximize the rate of flow of hydrogen through the septum.

In copending application Ser. No. 465,861 of R. C. Langley et al., filed June 22, 1965, now U.S. Patent No. 3,344,586, diffusion apparatus adapted for the separation of hydrogen from a mixture of gases is disclosed, which apparatus employs as the diffusion element a porous ceramic support coated with an integral thin film of palladium or palladium alloy. Such apparatus is designed so as to subject the porous ceramic elements thereof only to compressive isostatic pressure, and the apparatus is designed to eliminate the application of force in tension or shearing forces such as would be encountered by application of pressure to the edges of the ceramic diffusion element. Thus, ceramic supports which are capable of resisting extremely high isostatic compressive forces have been for the first time adapted for practical and commercial utilization in high pressure diffusion apparatus.

The present invention is particularly concerned with a novel method for applying a thin film of hydrogen-permeable non-porous metal to a porous ceramic support, and to the novel hydrogen diffusion element so produced.

In accordance with the present invention, a hydrogen diffusion element is prepared by applying to the surface of a porous ceramic support a thin deposit of glaze admixed with palladium, and fusing the deposit thus applied to produce a palladium-glaze film which is firmly bonded to the ceramic substrate. The palladium may be added to the glaze in the form of a finely divided powder of palladium or palladium-containing alloy, or may be added in the form of an organic solution of a palladium organic film forming compound. Such organic solution may contain, in addition to palladium, other metals in solution such as Ag, Au, Ni, Ru, Pt, etc. in such proportions as to form suitable alloys for hydrogen diffusion. Particularly suitable alloys for this purpose are binary alloys of palladium or silver containing from about 5 to about 40 weight percent silver, and binary palladium-gold alloys containing from about 10 to 40 wt. percent gold. The term "glaze" as used herein includes finely-divided glasses produced by melting and fritting prior to admixture with palladium, and finely divided glaze forming ingredients not melted and fritted prior to admixture with palladium, but capable of forming a vitreous glaze under film-forming conditions. A finely-powdered ceramic of the same material as the ceramic substrate may be added to the "glaze" to increase the softening temperature, and therefore the peak operating temperature, of the film.

The palladium-glaze film formed in accordance with the present invention comprises a fused, impervious glass matrix containing continuous paths of hydrogen-permeable metal from one surface to the opposite surface of the film.

Referring to the accompanying single figure, there is illustrated in greatly enlarged section, a diffusion element of the present invention. A palladium-glaze film 10 is shown deposited upon a porous ceramic support 11. In this figure, the letters A, B, C, D indicate various groupings of palladium or other hydrogen-permeable metal powder. Duffusion will only occur through path A, since there is at this point a continuous path of palladium from one surface of the film to the other. In order to provide sufficient numbers of paths of type A to obtain a film of practicable diffusion capacity, it is necessary to employ a mixture of metal and glaze containing a substantial proportion of metal. For example, when palladium in the form of a finely-divided powder is used, the mixture should contain at least about 50% by weight metal powder based on the total weight of metal powder and glaze, and preferably from about 75–95%. A mixture of about 91% by weight palladium powder–9% glaze has been found highly suitable for hydrogen diffusion. In general, the palladium-glaze mixture should contain at least about 5% glaze in order to provide adequate adhesion to the porous ceramic substrate.

The palladium-glaze films applied to a porous ceramic substrate in accordance with this invention have exhibited outstanding thermal and mechanical stability, e.g., remaining adherent to the support under applied pressures (on the external surface) as high as 1000 p.s.i.g. and temperatures as high as 1200° C.

In the preparation of the hydrogen-permeable film, palladium or palladium-containing alloys in finely-divided form, e.g., finer than 100 mesh, preferably below 325 mesh, are employed. Palladium powder, or known palladium alloys which exhibit high diffusion rates for hydrogen, e.g., palladium-gold, palladium-silver, palladium-platinum and the like can be satisfactorily employed. The hydrogen permeable film may also be prepared from a suspension of glaze in an organic solution of a palladium-organic film forming compound of the type used in the decorating art. Such solutions may also contain other metals in solution, such as Ag, Au, Ni, Pt, Ru, etc., in such proportions as to form suitable alloys for hydrogen diffusion.

The glaze employed in producing the film of the invention should be one which on fusing is impervious to gases and should be inert to hydrogen at elevated temperatures.

Various conventional high temperature ceramic glazes can be employed in the practice of the present invention. Those skilled in the art will select a glaze having expansion characteristics which match the ceramic substrate so as to avoid or minimize problems of differential expansion. Further, the glaze should soften at a temperature above the operating temperature of the diffusion unit, for example, above about 700° C., and preferably above about 800° C., so as to maintain the structural strength and integrity of the palladium-glaze film in the hydrogen diffusion temperature range of normally 400° C. to 800° C.

The glaze should, of course, have a softening and melting temperature below the softening temperature of the ceramic support employed in the diffuser to avoid distortion and loss of porosity thereof. Generally, glazes which melt at about 1000° C. are employed.

Satisfactory glazes generally consist of admixtures of alumina and silica containing various other oxide components, including, e.g., boria, calcium oxide, strontium oxide and the like, which components are incorporated in the glaze to provide specific thermal expansion and softening properties. Among the commercially available glazes which have been found satisfactory for the purposes set forth herein are Pemco P–1701, Corning 7056 and Ferro 3292. The nominal oxide composition of commercially available glazes which have been found suitable is given in the following table.

TABLE

| Ingredients as oxides | Parts by weight of | | |
|---|---|---|---|
| | Glaze "A" | Glaze "B" | Glaze "C" |
| | (1) | (2) | (3) |
| $Al_2O_3$ | 13.6 | 5.5 | 15.7 |
| $SiO_2$ | 44.9 | 70.6 | 51.3 |
| $B_2O_3$ | 35.4 | 45.1 | 29.0 |
| $K_2O$ | 3.5 | 19.3 | 7.5 |
| $Na_2O$ | 2.7 | 1.4 | 4.0 |
| $CaO$ | 9.5 | 0.4 | 36.4 |
| $SrO$ | 17.7 | 0.7 | 43.8 |
| | 127.3 | 143.0 | 187.7 |

As is well known to those skilled in the art of ceramic glazes, the ingredients of the above glazes can be varied widely to suit particular ceramic substrates. Thus, with $Al_2O_3$ and $SiO_2$ constant, increased $B_2O_3$ results in lowered melting range while maintaining low expansion. If lowered melting range and higher expansion is necessary to fit a particular substrate, $Al_2O_3$ ad $SiO_2$ can be kept constant, $B_2O_3$ can be decreased or eliminated, and the oxides, $K_2O$, $Na_2O$, $CaO$ and $SrO$, can be increased singly or as a group. Other glass forming ingredients, such as $BaO$, may also be used in approximately proportioned mixtures. For the purpose of this invention, it is essential that the glass not contain any components after fusing which can be reduced to metallic form by exposure to hydrogen at elevated temperature. For example, $PbO$ and $Bi_2O_3$ can not be used because of reduction to metal when heated in hydrogen even at moderately elevated temperatures.

The following mixtures of finely-divided palladium powder and glaze have been made for use in the preparation of hydrogen diffusion films:

| Mixture | Parts by weight | | Percent Pd |
|---|---|---|---|
| | Glaze | Pd | |
| A | 1 | 1 | 50 |
| B | 1 | 2 | 66.7 |
| C | 1 | 3 | 75 |
| D | 1 | 5 | 83.3 |
| E | 1 | 10 | 91 |
| F | 1 | 20 | 95.4 |
| G | 1 | 100 | 99 |
| H | 2 | 3 | 60 |

Both the glaze and Pd powders pass a 325 mesh sieve. They are mixed dry by shaking for one minute, in a Spex mixer mill. Samples of compositions B, C, D, E, F, G and H were mixed with $H_2O$ to form a paste which was then applied to a porous ceramic. Samples of mixtures G and F were also mixed with oil vehicles, e.g., naphthenic acid or rosin dissolved in terpineol before application to porous ceramic substrates. A sample of composition A was thoroughly mixed and applied dry to a porous ceramic substrate. A mixture of composition E containing glaze and palladium in the proportion of 1 to 10 and mixed with $H_2O$ as the vehicle was found particularly suitable. A diffusion element formed from this mixture is shown in Example I.

Preferably, the mixture of metal powder and glaze is supplied to the fired ceramic support. Alternatively, it may be applied to the ceramic when the latter is in the green state, and the support and palladium-containing film fired simultaneously. In both cases, the glaze should have a melting point somewhat below the firing temperature of the ceramic support.

The ceramic supports to which the palladium-glaze films of the present invention are applied should be highly resistant to physical and thermal shock, sufficiently porous for gas to flow through, and should preferably have a smooth surface finish in order to be able to coat a thin unbroken layer of the palladium-glaze film.

As more fully disclosed in copending U.S. application Serial Number 465,861, referred to above, a satisfactory porous ceramic support can be prepared from a mixture comprising generally from 50–90% by weight alkali aluminum silicates, 10–50% clay, and from 0–10% silica. It has been found that the free silica content should not exceed 10% by weight of the ceramic mix to provide a fired ceramic of low thermal expansion and good resistance to shock.

It has been further found that the ceramic body should be free of reducible components such as lead, iron or tin, for example, since the gases being separated provide a reducing atmosphere within the diffusion apparatus and reducible components could react adversely with the thin Pd-containing film.

In practice, the porosity of a ceramic mix such as that described above may be provided by adding carbon powder to the mix and firing the mix at a temperature and for a time sufficient to burn out the carbon powder while keeping the temperature as low as possible so as to reduce as much as possible the densification of the ceramic body formed by the melting of alkali aluminum silicates in the mix.

The particular components and their percentage in the mix may be varied to some extent and still produce thermal and structural properties which will be suitable for providing a ceramic support for a non-porous gas-permeable membrane coated thereon in accordance with the invention. In practice, nepheline syenite has proved a particularly suitable alkali aluminum silicate, and the clay component is preferably made up of a mixture of kaoline, which is included for its purity, and ball clay, which provides plasticity and strong bonding power. In preparing the ceramic parts of the ceramic body, the silicate, clay and silica are thoroughly mixed dry and then glycerin or water mixed with a binder, such as polyvinyl alcohol, methyl cellulose, acrylic resin, or polyethylene glycol, for example, is mixed in the dry materials to form a cohesive plastic mass suitable for molding into the desired shape. An emulsion of microcrystalline wax has also proved to be a good binder and lubricant. As discussed above, carbon powder, such as fine carbon black, is incorporated in the mix to provide porosity. The carbon black is suitably provided in the amount of 20–40%, by weight, of the total weight of the other dry ingredients of the mix.

The green-molded parts are fired in a periodic furnace which is progressively heated from room temperature to about 1100° C. over a 24-hour period. The furnace is then allowed to cool slowly to about room temperature again before the fired parts are removed. The firing may also be done in a continuous furnace, in which case the time required would be reduced to about one-third the time required in the periodic oven.

A specific example of the ingredients and the process for producing a suitable ceramic support is as follows:

*Preparation of support*

A dry mixture of 25% Georgia kaolin, 15% Tennessee ball clay, 55% nepheline syenite, and 5% silica is made by tumbling these ingredients in a bottle for several hours after which 200 mesh carbon black is added and thoroughly mixed in by further tumbling for about 8 hours. The porosity of the finished piece is largely determined by the amount of carbon black used and for a porosity of 40–50%, which is preferred in accordance with the invention; the proportion of carbon black to the other ingredients is about 20 to 40%.

When the dry mixing is complete, the mixture is dampened with a fluid which serves as a binder and lubricant. The moisture content is preferably about 25–30% which supplies the moisture necessary to be able to press the mass into the desired disk shape satisfactorily. The fluid is suitably 3–10% glycerine as the binder and the remainder water as the lubricant.

The fluid is mixed in to dampen the mixture thoroughly. Then the mixture is pressed into the desired disk shape (e.g. 1–3 inches by 1/8-inch thick) in a stainless steel mold at 5000 p.s.i. These disks are then air dried overnight and fired in a periodic furnace which is raised to a temperature of about 1100° C. progressively over a period of about 24 hours.

In general, it is preferred to have the porous ceramic supports as thin as possible, consistent with strength, to reduce the resistance of gas to flow. Preferably, the porous ceramic supports are 1/8–1/4 inch in thickness, and channels may be provided within the support to reduce the effective thickness to about 1/16–1/8 inch.

The palladium-glaze film of the invention should be sufficiently thin to provide high rates of hydrogen diffusion, but not so thin as to result in porosity which would decrease the purity of the separated diffused hydrogen stream. In general, a film thickness of one micron to one mil, preferably about 0.1 mil has been found effective. In practice, the film may be produced from a single coat of metal powder and glaze, but preferably is formed by coating with multiple layers thereof with intermittent firing until a film of desired thickness is built up.

The following examples are given to set forth in detail certain preferred embodiments of the invention, it being understood that the invention is not to be limited to the specific details set forth herein.

EXAMPLE I

Remco glaze P-1701 in the form of 325 mesh powder was mixed thoroughly with powdered palladium (325 mesh) in a weight ratio of 91% palladium/9% glaze. Water was added to form a slurry suitable for applying by brush and a thin coat of the slurry was painted on a porous ceramic support made as described hereinabove. The coated support was then fired to 1000° C., with a one-hour soak.

Four additional coats were similarly applied by brushing successive thin coats of the slurry on the ceramic, and firing at 1000° C. between each coat. A continuous, pore-free coating was thus obtained.

The coated ceramic support was then tested for leaks and for hydrogen permeability. The coated support did not leak at a presure of 30 p.s.i.g. nitrogen at a temperature of 600° C. Hydrogen applied to the coated support at 600° C. and 30 p.s.i.g. diffused through an area of the film of about 0.8 square inch at a rate of about 177 cc./minute.

Additional examples are given below to illustrate: a method of forming Pd-alloy-glaze films from a precursor mixture containing Pd and Ag or gold powders or alloys of Pd-Ag and Pd-Au in powder form mixed with glaze; a method of forming Pd-glaze films from Pd organic solutions; and a method of forming Pd-alloy-glaze films from organic solutions containing Pd and another metal such as Au or Ag.

EXAMPLE II

Various mixtures of palladium, gold, silver, or alloys of palladium with gold or silver, and glaze in the form of finely-divided powder (−325) were used in the preparation of hydrogen diffusion films on porous ceramic made as described above. The glaze was of the same composition as that used in Example I. Typical diffusion elements were prepared as follows:

Sample J: a mixture containing 7.5 parts Pd powder, 2.5 parts of Ag and 1.0 parts of Pemco glaze P-1701 was thoroughly mixed on a Spex mill and water was then added to form a paste. The paste was applied to a porous ceramic substrate and fired to 900° C. with a 30 minute soak at peak temperature to form a hydrogen diffusion film on the porous ceramic.

Sample K: in a similar manner a hydrogen diffusion film was prepared using a mixture containing 20 parts of an alloy of 75% Pd–25% Ag in the form of a finely divided powder and 2.0 parts of Pemco glaze P-1701.

Sample L: in a similar manner a hydrogen diffusion film was prepared using a mixture containing 20 parts of an alloy of 80% Pd–20% Au in the form of a finely divided powder and 2.0 parts of Pemco glaze P-1701.

Sample M: in a similar manner a hydrogen diffusion film was prepared using a mixture of 8 parts Pd powder, 2.0 parts Au powder, and 1.0 parts of Pemco glaze P-1701.

EXAMPLE III

A solution of palladium in which Pemco glaze P-1701 was suspended was made as follows:

| | Parts by weight |
|---|---|
| Pd resinate dissolved in a mixture of chloroform and essential oils (9% Pd) | 3.03 |
| Pemco glaze P-1701 (325 mesh) | 0.27 |
| | 3.30 |

The mixture was stirred mechanically to wet and disperse all of the glaze. The proportions were chosen to give a film containing 1:1 Pd:glaze by weight after firing. The mixture was applied to the surface of a porous ceramic and gave an essentially non-porous film after 6 coats with each coat fired to 1000° C. in air with a 60 minute soak at peak temperature. When tested for hydrogen diffusion at 500° and 600° C. and 15 p.s.i.g. hydrogen, the throughput was of a low order due to the large amount of glaze in the film. A diffuser of this type would be useful for controlling hydrogen concentration in instruments or in vacuum equipment of the research type.

For the purification of hydrogen in substantial volume, the following formulation may be used:

| | Parts by weight |
|---|---|
| Pd resinate dissolved in a mixture of chloroform and essential oils (9% Pd) | 30.30 |
| Corning glaze #7056 | 0.27 |
| | 30.57 |

This suspension gives a film containing 10:1 Pd:glaze by weight after firing on a porous ceramic.

EXAMPLE IV

A solution of palladium and silver in proportions to yield a 75:25 Pd:Ag alloy by weight after firing was made as follows:

| | Parts by weight |
|---|---|
| Silver naphthenate (32% Ag) | 0.94 |
| Palladium resinate dissolved in a mixture of chloroform and essential oils (9% Pd) | 10.0 |
| Oil of rosemary | 9.06 |
| | 20.0 |

The mixture was stirred mechanically at room temperature until all of the silver naphthenate had dissolved to form a fluid solution.

To this solution is added 0.1 gram of Pemco glaze P-1701, wetted and dispersed as described above. This amount of glaze yields a film containing 12 parts of alloy to 1 part of glaze after firing. The individual proportions are then 9:3:1 Pd:Ag:glaze.

EXAMPLE V

A solution containing palladium and gold in proportions to yield an alloy of 80:20 Pd:Au after firing was made by mixing together the following ingredients.

| | Parts by weight |
|---|---|
| Palladium resinate dissolved in a mixture of chloroform and essential oils (9% Pd) | 6.0 |
| Gold resinate dissolved in a mixture of nitrobenzene, oil of rosemary and chloroform (24% Au) | 0.56 |
| Oil of peppermint | 5.44 |
| | 12.00 |

To this fluid solution is added 0.1 gram Pemco glaze P–1701. This mixture is chosen to yield a ratio of 6.7 alloy to 1 part glaze after firing.

What is claimed is:

1. A diffusion element adapted for diffusion separation of hydrogen from a gaseous mixture containing hydrogen which diffusion element comprises a porous ceramic body structure having a surface coating of a vitreous glaze consisting essentially of a finely-divided hydrogen-permeable metal selected from the group consisting of palladium and palladium-containing alloys embedded in a glass matrix, said finely-divided metal comprising between about 50 to 95% by weight of said surface coating and said vitreous glaze having continuous paths of metal from one surface of the glaze to the other.

2. The diffusion element of claim 1 wherein the hydrogen-permeable metal is palladium.

3. The diffusion element of claim 1 wherein the hydrogen-permeable metal is an alloy of palladium and silver containing from about 5 to about 40 wt. percent silver, the remainder being palladium.

4. The diffusion element of claim 1 wherein the hydrogen-permeable metal is an alloy of palladium and gold containing from about 10 to 40 wt. percent gold, the remainder being palladium.

5. A method for producing a diffusion element for the diffusion of hydrogen from a gaseous mixture containing hydrogen which method comprises applying to a porous ceramic support a mixture consisting essentially of a finely-divided glaze and a finely-divided hydrogen-permeable metal selected from the group consisting of palladium and palladium-containing alloys, said mixture comprising from about 50 to about 95 wt. percent metal and at least 5% glaze and firing the coated support at the fusion temperature of the glaze but below the softening temperature of the ceramic support to produce a vitreous glaze, said vitreous glaze having continuous paths of metal from one surface of the glaze to the other, and thereafter cooling the fired diffusion element.

6. The method of claim 5 wherein the finely-divided hydrogen-permeable metal is palladium or an alloy of palladium.

7. The method of claim 5 wherein the mixture of glaze and metal powder is applied in the form of an aqueous slurry.

8. The method of claim 5 wherein the mixture of glaze and metal powder is applied in successive coats, each coat being fired prior to application of the next.

9. A method for producing a diffusion element for the diffusion of hydrogen from a gaseous mixture containing hydrogen which method comprises applying to a porous ceramic support a mixture of a finely-divided glaze suspended in a solution containing an organic metal film-forming compound, said mixture being adapted to provide upon firing a vitreous glaze consisting essentially of from about 50 to about 95 wt. percent of a hydrogen-permeable metal selected from the group consisting of palladium and palladium alloys and at least 5% glaze, based on the weight of metal plus glaze, and firing the coated support at the fusion temperature of the glaze but below the softening temperature of the ceramic support to produce a vitreous glaze, said vitreous glaze having continuous paths of metal from one surface of the glaze to the other, and thereafter cooling the fired diffusion element.

10. The metal of claim 9 wherein the organic metal film-forming compound comprises a compound of palladium.

References Cited

UNITED STATES PATENTS

| | | | |
|---|---|---|---|
| 1,174,631 | 3/1916 | Snelling | 55—158 |
| 3,172,742 | 3/1965 | Rubin | 55—158 X |
| 3,216,834 | 11/1965 | Fitch | 117—123 X |
| 3,329,526 | 7/1967 | Daily et al. | 117—123 X |
| 3,337,365 | 8/1967 | Mones | 117—123 X |

RALPH S. KENDALL, *Primary Examiner.*

H. COHEN, *Assistant Examiner.*